(12) United States Patent
Sathyan et al.

(10) Patent No.: US 9,319,824 B2
(45) Date of Patent: Apr. 19, 2016

(54) SYSTEM, WIRELESS COMMUNICATION DEVICE AND METHOD FOR COMBINING COMPATIBLE SERVICES

(71) Applicant: Infosys Limited, Bangalore, Karnataka (IN)

(72) Inventors: Jithesh Sathyan, Kollam (IN); Krishnananda Shenoy, Bangalore (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 14/339,912

(22) Filed: Jul. 24, 2014

(65) Prior Publication Data

US 2014/0335835 A1 Nov. 13, 2014

Related U.S. Application Data

(62) Division of application No. 12/689,005, filed on Jan. 18, 2010, now Pat. No. 8,793,306.

(51) Int. Cl.
| | |
|---|---|
| *H04M 1/725* | (2006.01) |
| *H04W 4/00* | (2009.01) |
| *H04L 12/54* | (2013.01) |
| *H04W 88/02* | (2009.01) |

(52) U.S. Cl.
CPC ............ *H04W 4/001* (2013.01); *H04L 12/5693* (2013.01); *H04M 1/72525* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 6,330,460 B1 * | 12/2001 | Wong et al. | 455/562.1 |
| 6,823,522 B1 | 11/2004 | Lamb | |
| 6,961,567 B1 | 11/2005 | Kuhn | |
| 6,988,274 B2 | 1/2006 | Machin et al. | |
| 7,254,645 B2 | 8/2007 | Nishi | |
| 7,359,516 B1 | 4/2008 | Skinner et al. | |
| 7,454,750 B2 | 11/2008 | Fitts et al. | |
| 7,894,847 B2 | 2/2011 | Kuhn | |
| 7,941,541 B2 * | 5/2011 | Chang et al. | 709/227 |
| 7,983,246 B2 | 7/2011 | Lee | |
| 8,144,873 B2 | 3/2012 | Skinner et al. | |
| 8,146,099 B2 | 3/2012 | Tkatch et al. | |
| 8,271,541 B2 | 9/2012 | Mohan et al. | |
| 2002/0103878 A1 | 8/2002 | Moncibais | |
| 2002/0103881 A1 | 8/2002 | Granade et al. | |
| 2002/0138611 A1 * | 9/2002 | Roe et al. | 709/224 |
| 2003/0079047 A1 * | 4/2003 | Fitts et al. | 709/310 |
| 2005/0262185 A1 | 11/2005 | Beartusk et al. | |
| 2006/0030306 A1 | 2/2006 | Kuhn | |

(Continued)

*Primary Examiner* — Ninos Donabed
(74) *Attorney, Agent, or Firm* — Lerner, David, Litttenberg, Krumholz & Mentlik, LLP

(57) ABSTRACT

The present invention provides a system, wireless communication device, method and computer program product for combining one or more compatible services with a current service. A user of a wireless communication device is subscribed with a registered service provider. A user sends a request for identifying the one or more compatible services with the current service to the registered service provider. The registered service provider identifies and sends a list of the identified compatible services to the wireless communication device. The user then selects at least one compatible service from the list of the identified compatible services. Thereafter, the registered service provider sends the software required for combining the selected compatible services with the current service. The user creates a combined service by combining the selected compatible services with the current service using the software on the wireless communication device.

26 Claims, 11 Drawing Sheets

(56) References Cited

U.S. PATENT DOCUMENTS

| | | | |
|---|---|---|---|
| 2006/0031497 A1 | 2/2006 | Beartusk et al. | |
| 2006/0135135 A1* | 6/2006 | Rybak | H04L 51/38 455/414.1 |
| 2006/0165083 A1 | 7/2006 | Lee | |
| 2006/0189278 A1* | 8/2006 | Scott | G10L 13/02 455/90.3 |
| 2006/0258341 A1* | 11/2006 | Miller et al. | 455/414.1 |
| 2006/0264222 A1 | 11/2006 | Cole et al. | |
| 2007/0077914 A1 | 4/2007 | Trevor Plestid et al. | |
| 2007/0077964 A1* | 4/2007 | Llanos | H04W 88/06 455/557 |
| 2007/0094211 A1* | 4/2007 | Sun et al. | 706/50 |
| 2007/0178899 A1 | 8/2007 | Kuhn | |
| 2007/0204228 A1* | 8/2007 | Minear | H04M 3/493 715/728 |
| 2007/0281701 A1 | 12/2007 | Cole et al. | |
| 2007/0287438 A1 | 12/2007 | Hansen et al. | |
| 2007/0294385 A1* | 12/2007 | Kapadekar | G06F 8/65 709/223 |
| 2008/0003994 A1 | 1/2008 | Skinner et al. | |
| 2008/0020789 A1 | 1/2008 | Yan et al. | |
| 2008/0021799 A1 | 1/2008 | Blowers | |
| 2008/0113683 A1* | 5/2008 | Paas | H04M 1/72519 455/552.1 |
| 2008/0176550 A1 | 7/2008 | Skinner et al. | |
| 2008/0233967 A1 | 9/2008 | Montojo et al. | |
| 2008/0248829 A1 | 10/2008 | Zilca et al. | |
| 2008/0261621 A1 | 10/2008 | Cole et al. | |
| 2009/0005039 A1 | 1/2009 | Kuhn | |
| 2009/0069051 A1* | 3/2009 | Jain | G06K 19/07739 455/558 |
| 2009/0132688 A1* | 5/2009 | Kafer et al. | 709/223 |
| 2012/0266168 A1 | 10/2012 | Spivak et al. | |

* cited by examiner

SYSTEM, WIRELESS COMMUNICATION DEVICE AND METHOD FOR COMBINING COMPATIBLE SERVICES

CROSS-REFERENCE TO RELATED APPLICATIONS

The present application is a divisional of U.S. patent application Ser. No. 12/689,005, filed on Jan. 18, 2010, which is hereby incorporated herein by reference.

BACKGROUND OF THE INVENTION

The present invention relates to a system and a method for providing services to a user. More specifically, it relates to a system and a method by which the user has a choice or control for combining one or more services with a service being currently used by the user.

Currently, a service provider such as a mobile service provider provides various services to a subscribed user. Various services include multimedia services, web-based services, text-based services and call-based services. Various examples of the services are a call waiting service, a Short Message Service (SMS), an audio streaming service, a video streaming service, a video conferencing service, and the like.

In the current state of technology, the user can only use a single service at any instance provided by the service provider, such as using a music player. However, the user may wish to use other services along with a service that is currently being used by the user. For example, music player service and sharing service enabling the running of the music player on a desktop simultaneously. In addition to that, the user cannot use/combine the services that are provided by other service providers with the services that are provided by the subscribed service provider. For example, the user currently cannot use a service such as a voice-enabled interactive service provided by another service provider.

In light of the discussion above, there is a need of a system and a method for enabling and giving control to the user to combine one or more services with the service that is currently being used by the user. Further, the system and method should enable the user to combine the services available across different service providers and not restrict them within the subscribed service provider.

BRIEF SUMMARY OF THE INVENTION

An object of the invention is to enable a user to combine one or more compatible services with a service being currently used by the user on his/her wireless communication device.

To achieve the above objective, the invention provides a system and a method for enabling a user to combine one or more compatible services with a service currently used by the user, hereinafter referred to as a current service, on a wireless communication device. The user is subscribed with a service provider, hereinafter referred to as a registered service provider, for availing various services. The system enables the user to combine various compatible services with the current service. Further, the system is integrated with the registered service provider. The system receives a request from the user to identify the one or more compatible services with the current service. The system then identifies the compatible services and sends a list of the identified compatible services to the user. Thereafter, based on at least one compatible service selected by the user from the list of the compatible services, the system sends one or more mesh plug-ins corresponding to the selected compatible services. The mesh plug-ins enable the user to combine the selected compatible services with the current service. This enables the user to create unique services according to the requirements. The user has the control to create these services and is not dependent on the registered service provider.

The invention also provides a wireless communication device and a method for combining one or more compatible services with a current service. The wireless communication device sends a request to the registered service provider to identify the one or more compatible services with the current service. The wireless communication device then receives a list of the identified compatible services from the registered service provider. The user then selects at least one compatible service from the list of the identified compatible services according to his/her need and application. Thereafter, the wireless communication device sends a list of the selected compatible services to the registered service provider. Further, the wireless communication device sends a mesh plug-in download request to download the mesh plug-ins corresponding to the selected compatible services. Subsequently, the wireless communication device downloads the mesh plug-ins corresponding to the selected compatible services from the registered service provider. The wireless communication device then executes the downloaded mesh plug-ins. The execution of the mesh plug-ins combines the selected compatible services with the current service. The combination of the selected compatible services with the current service results in the formation of a new service.

The method, system, wireless communication device and computer program product described above have a number of advantages. The system and the wireless communication device enable a user to combine one or more compatible services with a current service. This facilitates the enhancement of the current service. Further, the system and wireless communication device enable the user to access the service from multiple service providers in addition to a registered service provider. Furthermore, since the services are executed independently at the corresponding service providers, it is easy for the service providers to charge the user according to the usage of the services.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

The present invention provides a system, a wireless communication device, a method and a computer program product for enabling a user to combine one or more compatible services with a service currently being used by the user on his wireless communication device. The user is subscribed with a service provider, hereinafter referred to as a registered service provider, for availing various multimedia, web-based, text-based and call-based services. The user sends a request to the registered service provider to identify compatible services with the service being currently used by the user on his/her wireless communication device. In response to the request, the registered service provider identifies the compatible services and enables the user to combine the compatible services with the service currently being used by the user.

Figure 1:
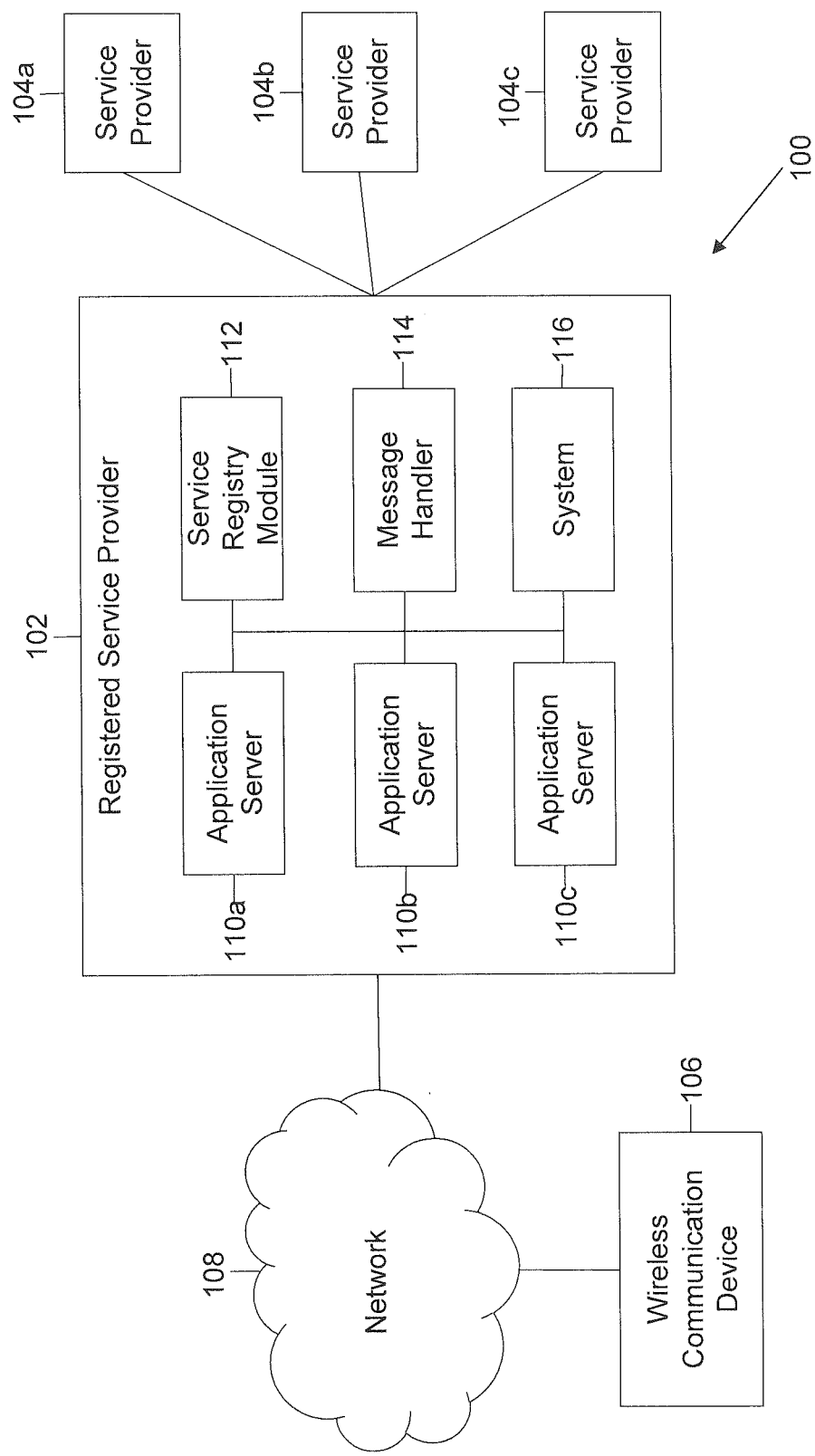
FIG. 1 illustrates an environment in which various embodiments of the invention may be practiced.

FIG. 1 illustrates an environment 100 in which various embodiments of the invention may be practiced. Environment 100 includes a registered service provider 102, one or more service providers such as a service provider 104a, a service provider 104b and a service provider 104c; a wireless communication device 106, and a network 108. Registered service provider 102 includes one or more application servers such as an application server 110a, an application server 110b, and an application server 110c; a service registry module 112, a message handler 114, and a system 116. Similarly, each of the service providers, hereinafter referred to as service providers 104, also includes a plurality of application servers such as application server 110a, application server 110b, and application server 110c; a service registry module such as service registry module 112, and a message handler such as message handler 114.

Wireless communication device 106, registered service provider 102 and service providers 104 are connected in network 108. Various examples of network 108 include, but are not limited to, wireless networks such as mobile telephone networks, Wi-Fi, WiMax, wireless local area network (WLAN) and Bluetooth. Further, various examples of the mobile telephone networks include, but are not limited to, Cellular Digital Packet Data (CDPD) network, Global System for Mobile communications (GSM) network, and General Packet Radio Service (GPRS). In another embodiment of the invention, network 108 can be a wired network.

A user is subscribed with registered service provider 102 in order to avail multiple services on wireless communication device 106 over network 108. In an embodiment of the invention, the services include multimedia services, web-based services, text-based services, and call-based services. Various examples of the services include, but are not limited to, a call recording service, a call forwarding service, a call waiting service, an SMS, an audio streaming service, a video streaming service, a video conferencing service, a desktop sharing service which enable the user to share the desktop of wireless communication device 106 during a video conference, a video conference recording service, a service which enable the user to email a recorded video conference, an online chatting service, an online gaming service, an online TV service, and a Multimedia Message Service (MMS).

Various application servers such as application server 110a, application server 110b and application server 110c, hereinafter referred to as application servers 110. Each application server 110 stores multiple services. For example, an application server such as application server 110a may store a media player service and the video conference recording service. Similarly, another application server such as application server 110b may store the online gaming, the desktop sharing service, the online chatting service and the video conferencing service.

It may be apparent to any person skilled in the art that these services are executed at the corresponding application servers 110. Similarly, various application servers 110 associated with service providers 104, also provide such multimedia, web-based, text-based and call-based services. In various embodiments of the invention, the current service as mentioned above can be stored at corresponding application servers 110 associated with either registered service provider 102 or service providers 104.

Service registry module 112 stores a list of a plurality of services. The plurality of services includes the services provided by registered service provider 102 and service providers 104. For example, the list of services may include the call recording service, the call forwarding service, the call waiting service, the SMS, the audio streaming service, the video streaming service, the video conferencing service, the desktop sharing service, the video conference recording service, the service which allows the user to email the recorded video conference, the online chatting, the online gaming, the online TV and the MMS.

Message handler 114 associated with registered service provider 102 enables secure communication between application servers 110 associated with registered service provider 102. The communication between application servers 110 is performed using various messages. Moreover, the message format followed by application servers 110 may be different. Therefore, message handler 114 performs format conversion for reliable communication. Further, message handler 114 enables effective communication between application servers 110 by managing message queues. In various embodiments of the invention, message handler 114 contains message handler software. An example of such message handler software is WebSphere MQ® from IBM®. Similarly, message handler 114 associated with service providers 104 enables communication between application servers 110 associated with service providers 104.

System 116 receives a request to identify one or more compatible services with a current service being used by the user. For example, the current service provided by registered service provider 102 may be a video conferencing service. In an embodiment of the invention, system 116 receives the request through service registry module 112. Further, the request is sent by the user to service registry module 112. For example, the request may be to identify the compatible services with the video conferencing service, which is currently being used by the user.

System 116 identifies the compatible services with the current service from the services provided by registered service provider 102 and service providers 104. Further, the identification of the compatible services is explained in detail in conjunction with FIG. 2 and FIG. 3. Following the example above, various examples of such identified compatible services with the video conferencing service include the desktop sharing service, the online gaming service, the video conference recording service and the service that enables the user to email a recorded video conference. System 116 then sends a list of the identified compatible services to the user through service registry module 112. Further, system 116 enables the user to combine the compatible services with the current service. The enablement of the combination of the compatible services with the current service by system 116 is explained in detail in conjunction with FIG. 2 and FIG. 3.

Wireless communication device 106 receives the list of the compatible services from registered service provider 102. Further, wireless communication device 106 selects at least one compatible service from the list of the identified compatible services. Based on the users need and application, the user may select the desktop sharing service and the video conference recording service from the list of compatible services with the video conferencing service. Wireless communication device 106 then combines the selected compatible services with the current service. Further, the combination of the selected compatible services with the current service handled by wireless communication device 106 is explained in detail in conjunction with FIG. 4 and FIG. 5. Various examples of wireless communication device 106 include, but are not limited to, a mobile device, a Personal Digital Assistant (PDA), a laptop, a computer, a navigational device, and the like.

Figure 2:
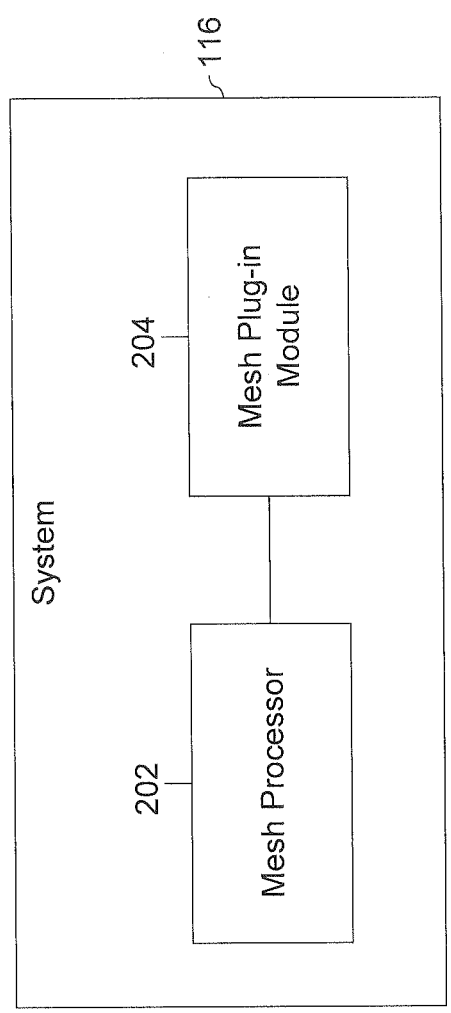
FIG. 2 is a block diagram of a system for enabling a user to combine one or more compatible services with a current service, in accordance with an embodiment of the invention.

FIG. 2 is a block diagram of system 116 for enabling a user to combine one or more compatible services with a current service being used by the user, in accordance with an embodiment of the invention. System 116 includes a mesh processor 202 and a mesh plug-in module 204.

Mesh processor 202 receives a request to identify one or more compatible services with a current service. In various embodiments of the invention, the current service is provided by registered service provider 102. For example, the current service may be a video conferencing service. Further, as explained earlier, the request is forwarded by service registry module 112 to system 116. For example, the user may send a request to identify compatible services with a video conferencing service.

Mesh processor 202 identifies the compatible services from a plurality of services provided by registered service provider 102 and service providers 104. For example, the identified compatible services with the video conferencing service include the desktop sharing service, the online gaming service, the video conference recording service and the service that enable the user to email a recorded video conference.

In an embodiment of the invention, mesh processor 202 maintains a list of a plurality of services provided by registered service provider 102 and service providers 104. Mesh processor 202 identifies the compatible services from the list of the plurality of services. Further, mesh processor 202 stores the list of the plurality of services. In various embodiments of the invention, the list stored in mesh processor 202 is a replica of the list of the plurality services stored in service registry module 112.

In another embodiment of the invention, mesh processor 202 identifies the compatible services by broadcasting the request to application servers 110 associated with registered service provider 102, and application servers 110 associated with service providers 104. It may be apparent to any person skilled in the art that broadcasting of the request for a compatible service with the current service is broadcasting the service definition of the current service.

The corresponding application servers 110 associated with registered service provider 102 and service providers 104 then identify the compatible services in response to the request. In an embodiment of the invention, each service provided by application servers 110, associated with registered service provider 102 and service providers 104, understands the inputs that it can handle, based on the current service. Further, each service parses the request and identifies if it is compatible with the current service. Thereafter, the corresponding application servers 110 send a list of the identified compatible services to mesh processor 202.

In an embodiment of the invention, mesh processor 202 then sends a list of the identified compatible services to wireless communication device 106 through service registry module 112.

Mesh plug-in module 204 stores a plurality of mesh plug-ins corresponding to the services provided by registered service provider 102 and service providers 104. A mesh plug-in is software that facilitates the combination of the current service with the corresponding compatible service. Further, mesh plug-in module 204 selects one or more mesh plug-ins from the stored mesh plug-ins. The selected mesh plug-ins correspond to at least one compatible service. In various embodiments of the invention, mesh plug-in module 204 selects the corresponding mesh plug-ins based on a request, hereinafter referred to as a mesh plug-in download request, received from wireless communication device 106. The mesh plug-in download request is sent to mesh plug-in module 204 when the user selects the at least one compatible service from the received list of the compatible services. Following the example above, if the user selects the desktop sharing service and the video conference recording service, then mesh plug-in module 204 selects mesh plug-ins corresponding to the desktop sharing service and the video conference recording service.

In an embodiment of the invention, a single mesh plug-in facilitates the combination of the selected compatible services with the current service. For example, a single mesh plug-in facilitates the combination of the desktop sharing service and the video conference recording service with the video conferencing service. In another embodiment of the invention, each mesh plug-in corresponds to only one compatible service.

After the selection of the corresponding mesh plug-ins, mesh plug-in module 204 sends the selected mesh plug-ins to wireless communication device 106. These mesh plug-ins enable wireless communication device 106 to combine the selected compatible services with the current service.

Figure 3:
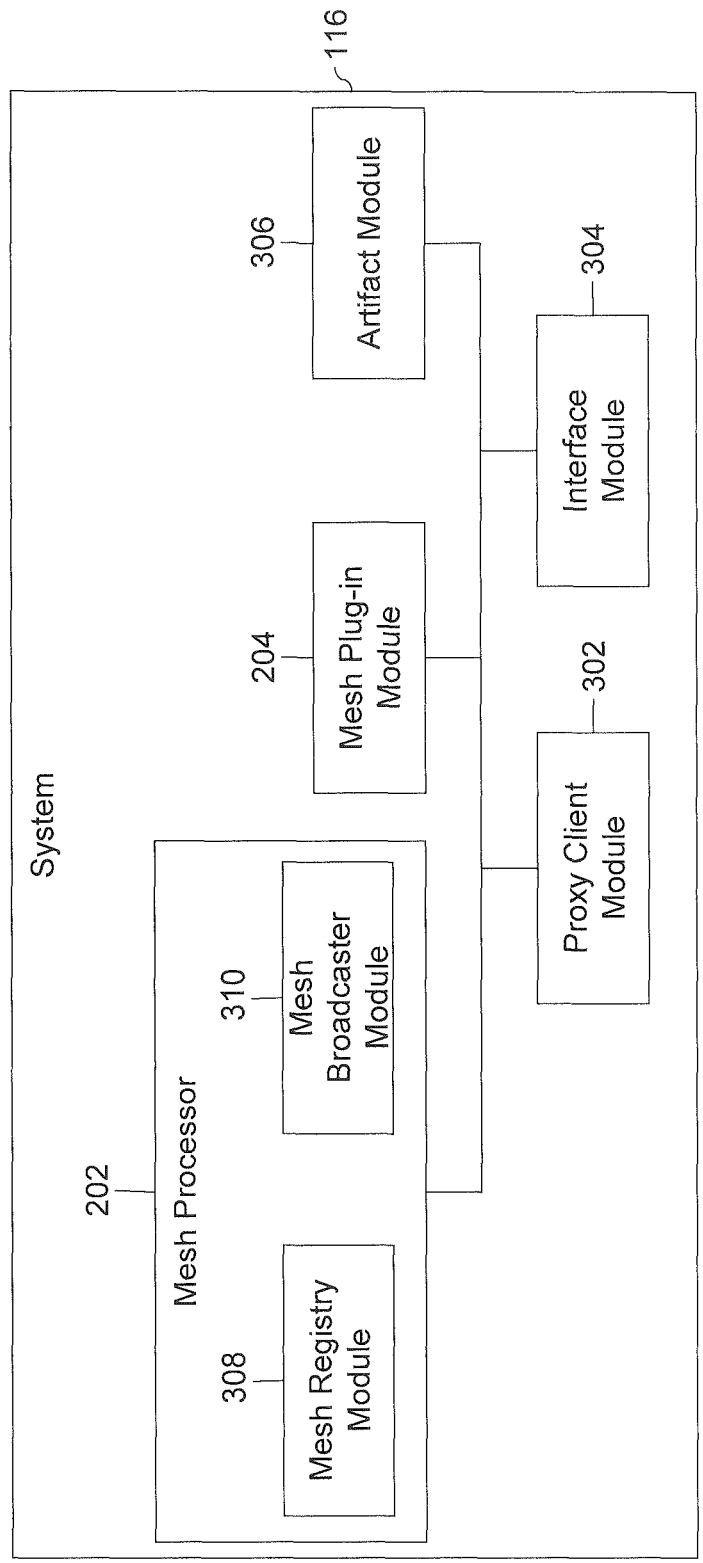
FIG. 3 is a block diagram of the system for enabling the user to combine one or more compatible services with a current service, in accordance with another embodiment of the invention.

FIG. 3 is a block diagram of system 116 for enabling a user to combine one or more compatible services with a current service, in accordance with another embodiment of the invention. System 116 includes mesh processor 202, mesh plug-in module 204, a proxy client module 302, an interface module 304, and an artifact module 306. Mesh processor 202 includes a mesh registry module 308 and a mesh broadcaster module 310.

Mesh processor 202 receives a request for identifying one or more compatible services with a current service. For example, the current service may be a video conferencing service. In various embodiments of the invention, the current service is provided by registered service provider 102. In various embodiments of the invention, the current service as mentioned above can be stored at registered service provider 102 or service providers 104, and can be accessed through registered service provider 102. Further, accessing of the current service is explained below in detail in conjunction with proxy client module 302.

Mesh processor 202 identifies the compatible services with the current service from a plurality of services provided by registered service provider 102 and service providers 104.

In an embodiment of the invention, mesh processor 202 identifies the compatible services from mesh registry module 308. Mesh registry module 308 stores a list of a plurality of services provided by registered service provider 102 and service providers 104. In various embodiments of the invention, the list of services stored in mesh registry module 308 is a replica of the list of services stored in service registry module 112.

Service registry module 112 updates itself when a fresh service is launched either by registered service provider 102 or service providers 104. It may be apparent to any person skilled in the art that service registry module 112 updates the list of services on the launch of the fresh service. Further, mesh registry module 308 is pre-programmed to update itself with the updated list of the services containing the newly added service. For example, when registered service provider 102 launches a fresh service such as an online TV service, service registry module 112 updates the list of services with the detail of the online TV service. Further, as explained earlier, mesh registry module 308 automatically updates itself with the updated list of the services containing the online TV service.

In another embodiment of the invention, mesh processor 202 forwards the request to identify the compatible services to mesh broadcaster module 310. Mesh broadcaster module 310 then broadcasts the request to the corresponding application servers 110 associated with registered service provider 102 and service providers 104. Corresponding application servers 110 then identify the compatible services with the current service. In an embodiment of the invention, each service provided by application servers 110 associated with registered service provider 102 and service providers 104 understands the inputs that it can handle, based on the current service. Further, each service parses the request and identifies if it is compatible with the current service. Corresponding application servers 110 then send a list of the identified compatible services to mesh broadcaster module 310. It may be apparent to any person skilled in the art that the list of the identified compatible services sent to mesh broadcaster module 310 is selected from application servers 110 associated with registered service provider 102 and service providers 104.

In an embodiment of the invention, mesh processor 202 then sends the list of the identified compatible services to wireless communication device 106 through service registry module 112.

Mesh plug-in module 204 selects one or more mesh plug-ins corresponding to at least one compatible service when the user selects the at least one compatible service from the received list of compatible services. A mesh plug-in is software that facilitates the combination of the current service with the corresponding compatible service. The combination of the selected compatible services with the current service results in the formation of a new service. Further, mesh plug-in module 204 is explained in detail in conjunction with FIG. 2.

Proxy client module 302 stores a plurality of proxy clients corresponding to the services provided by registered service provider 102 and service providers 104. A proxy client is software that facilitates the execution of a service from the corresponding application servers 110 associated with registered service provider 102 and service providers 104.

In various embodiments of the invention, proxy client module 302 sends a proxy client corresponding to the current service. Further, proxy client module 302 selects one or more proxy clients corresponding to the selected compatible services from the stored proxy clients. In various embodiments of the invention, proxy client module 302 selects the corresponding proxy clients based on a request, hereinafter referred to as a proxy client download request, received from wireless communication device 106. The proxy client download request is sent to proxy client module 302 when the user selects the at least one compatible service from the received list of compatible services. Following the example above, if the user selects the desktop sharing service and the video conference recording service from the list of compatible services with the video conferencing service, then proxy client module 302 selects proxy clients corresponding to the desktop sharing service and the video conference recording service.

After the selection of the corresponding proxy clients, proxy client module 302 sends the selected proxy clients to wireless communication device 106. These proxy clients enable wireless communication device 106 to execute the desktop sharing service and the video conference recording service from the corresponding application servers 110 associated with registered service provider 102 and service providers 104. It may be apparent to any person skilled in the art that in the example above, the proxy clients corresponding to the current service, i.e., video conferencing service, and selected compatible services, i.e., the desktop sharing service and the video conference recording service, are executed at the corresponding application servers 110 associated with registered service provider 102 and service providers 104.

Interface module 304 enables communication between registered service provider 102 and service providers 104. Various communications performed through interface module 304 include broadcasting of the request to service providers 104, receiving the list of identified services from service providers 104, executing of the selected compatible services on the corresponding application servers 110 associated with service providers 104.

Artifact module 306 stores usage information corresponding to the services provided by registered service provider 102 and service providers 104. The usage information is information relating to the terms and conditions corresponding to the usage of the services. The usage information includes a service user manual, version type, a term of use, a plurality of usage restrictions, billing information, and copyright information.

Artifact module 306 sends the usage information corresponding to the selected compatible services to wireless communication device 106 when the user selects the compatible services from the list of the compatible services sent by registered service provider 102. For example, if the user selects the desktop sharing service and the video conference recording service, the usage information corresponding to these services is sent to wireless communication device 106.

Figure 4:
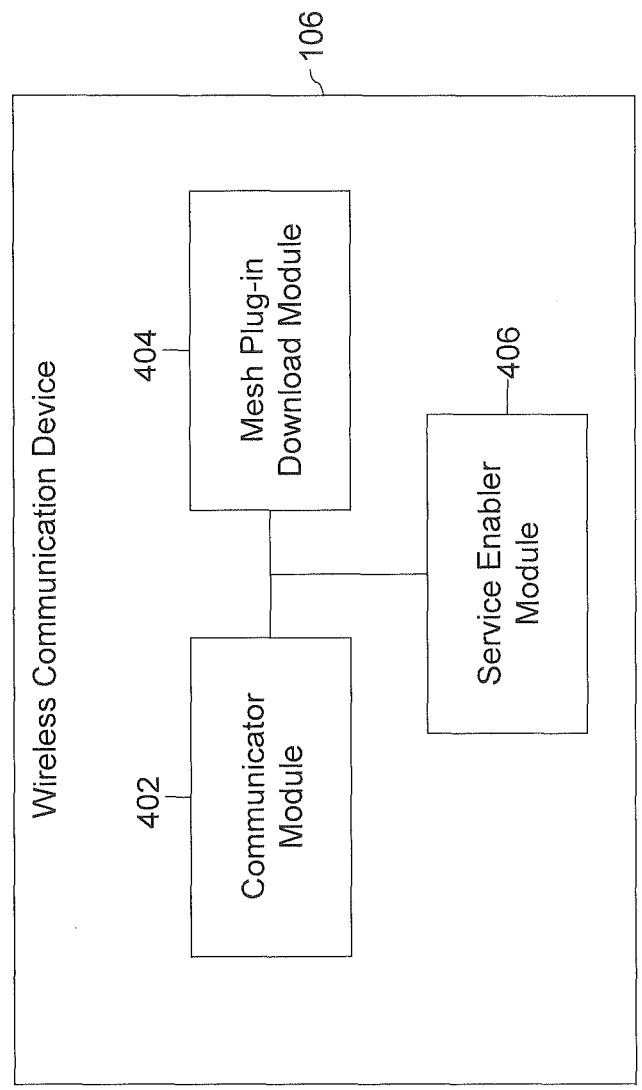
FIG. 4 is a block diagram of a wireless communication device for combining one or more compatible services with a current service, in accordance with an embodiment of the invention.

FIG. 4 is a block diagram of wireless communication device 106 for combining one or more compatible service with a current service, in accordance with an embodiment of the invention. Wireless communication device 106 includes a communicator module 402, a mesh plug-in download module 404, and a service enabler module 406.

A user of wireless communication device 106 is subscribed with registered service provider 102 for availing various services. In an embodiment of the invention, the services include multimedia, web-based, text-based and call-based services. The user may currently avail a service, hereinafter referred to as a current service, provided by either registered service provider 102 or service providers 104. Following the example above, the current service may be the video conferencing service.

Communicator module 402 sends a request to registered service provider 102 to identify one or more compatible services with the current service. It may be apparent to any person skilled in the art that the request is sent when the user desires to enhance the current service. In an embodiment of the invention, the request is received by service registry module 112 over network 108. For example, the user may send the request to identify the compatible services with the video conferencing service.

Communicator module 402 then receives a list of the one or more compatible services from registered service provider 102 in response to the request. It may be apparent to any person skilled in the art that the list of compatible services will be displayed on wireless communication device 106. Following the example above, the identified compatible services that are compatible with the video conferencing service may include the desktop sharing service, the online gaming service, the video conference recording service and the service that enables the user to email a recorded video conference.

Communicator module 402 sends a list of at least one compatible service to registered service provider 102. It may be apparent to any person skilled in the art that the at least one compatible service is selected from the received list of compatible services to registered service provider 102. Following the example above, the user may select the desktop sharing service and the video conference recording service.

Communicator module 402 then sends a mesh plug-in download request to registered service provider 102 to download one or more mesh plug-ins corresponding to the selected compatible services. As explained earlier, a mesh plug-in is software that facilitates the combination of the corresponding selected compatible services with the current service. It may be apparent that the mesh plug-in download request is sent when the user selects the compatible services from the list of the identified compatible services. Following the example above, communicator module 402 sends a request to download mesh plug-ins corresponding to the desktop sharing service and the video conference recording service, when the user selects the desktop sharing service and the video conference recording service from the list of identified compatible services with the video conferencing service.

Mesh plug-in download module 404 downloads the mesh plug-ins corresponding to the selected compatible services. For example, mesh plug-in download module 404 downloads mesh plug-ins corresponding to the desktop sharing service and the video conference recording service.

In an embodiment of the invention, a single mesh plug-in is downloaded that facilitates the combination of the selected compatible services with the current service. For example, a single mesh plug-in is downloaded which facilitates the combination of the desktop sharing service and the video conference recording service. In another embodiment of the invention, each mesh plug-in corresponds to only one compatible service.

Service enabler module 406 executes the downloaded mesh plug-ins. Each downloaded mesh plug-in combines corresponding selected compatible service with the current service. The combination of the selected compatible services with the current service results in the formation of a new service. For example, service enabler module 406 executes the mesh plug-ins corresponding to the desktop sharing service and the video conference recording service. Further, the mesh plug-ins combine the desktop sharing service and the video conference recording service with the video conferencing service. The combination of the desktop sharing service, the video conference recording service and the video conferencing service results in the formation of an enhanced video conferencing service.

Figure 5:
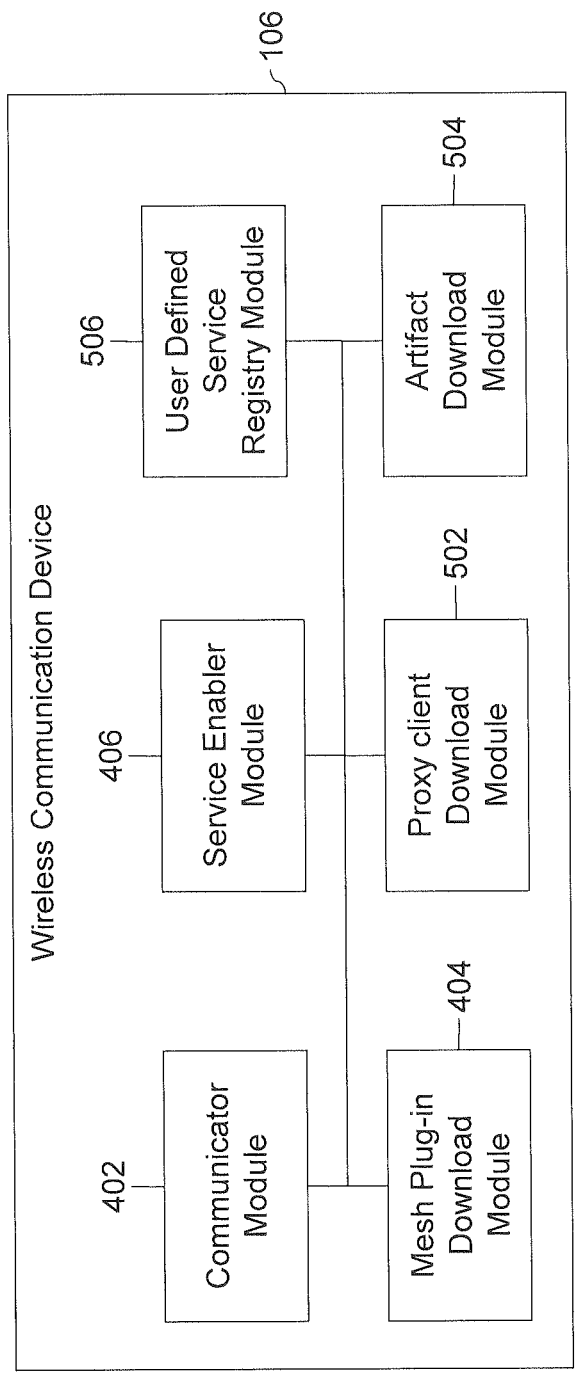
FIG. 5 is a block diagram of the wireless communication device for combining one or more compatible services with a current service, in accordance with another embodiment of the invention.

FIG. 5 is a block diagram of wireless communication device 106 for combining one or more compatible service with a current service, in accordance with another embodiment of the invention. Wireless communication device 106 includes communicator module 402, mesh plug-in download module 404, service enabler module 406, a proxy client download module 502, an artifact download module 504, and a user defined service registry module 506.

In various embodiments of the invention, a user uses a current service provided by registered service provider 102. Further, the current service as mentioned above can be stored at registered service provider 102 or service providers 104, and can be accessed through registered service provider 102. Further, accessing of the current service is explained in detail in conjunction with FIG. 3.

Communicator module 402 sends a request to registered service provider 102 to identify one or more compatible services with the current service. Communicator module 402 then receives a list of the compatible services from registered service provider 102 in response to the request. Further, communicator module 402 sends a mesh plug-in download request to registered service provider 102 to download one or more mesh plug-ins corresponding to at least one compatible service. The at least one compatible service is selected by a user from the received list of compatible services. Furthermore, communicator module 402 is explained in detail in conjunction with FIG. 4.

Mesh plug-in download module 404 downloads the mesh plug-ins corresponding to the selected compatible services. Further, mesh plug-in module 404 is explained in detail in conjunction with FIG. 4.

Service enabler module 406 executes the downloaded mesh plug-ins. Each downloaded mesh plug-in then combines the corresponding selected compatible service with the current service. The combination of the selected compatible services with the current service results in the formation of a new service. Further, service enabler module 406 is explained in detail in conjunction with FIG. 4.

In addition to the functions described in FIG. 4, communicator module 402 sends a proxy client download request to download a proxy client corresponding to the current service. As described earlier, a proxy client is software that executes a service from the corresponding applications servers associated with registered service provider 102 and service providers 104. Further, communicator module 402 sends a proxy client download request to download one or more proxy clients corresponding to the selected compatible service. It may be apparent that the proxy client download request is sent when the user selects the at least one compatible service from the list of the identified compatible services. Following the example described in FIG. 4, communicator module 402 sends the proxy client download request to download proxy clients corresponding to the desktop sharing service and the video conference recording service when the user selects these services from the list of compatible services with the video conferencing service.

Proxy client download module 502 downloads the proxy clients corresponding to the current service and the selected compatible services. For example, proxy client download module 502 downloads proxy clients corresponding to the current service, i.e., video conferencing service, and the selected compatible services, i.e., desktop sharing service and the video conference recording service. Further, proxy client download module 502 stores the downloaded proxy clients.

In addition to the functions described in FIG. 4, service enabler module 406 executes the downloaded proxy clients. The execution of the downloaded proxy clients facilitates the execution of the services at the corresponding servers associated with registered service provider 102 and service providers 104. In an embodiment of the invention, each service has one corresponding proxy client. Following the example above, since the video conferencing service is provided by registered service provider 102, the execution of the proxy client corresponding to the video conferencing service executes the video conferencing service from the corresponding application server 110 of registered service provider 102. Similarly, if the desktop sharing service is provided by application server 110a of service provider 104b, the proxy client corresponding to the desktop sharing service executes the desktop sharing service from application servers 110a of service provider 104b. Further, if the video conference recording service is provided by application server 110a associated with registered service provider 102, the proxy client corresponding to the desktop sharing service executes the video conference recording service from application servers 110a of registered service provider 102.

Service enabler module 406 assigns a name to the new service. It may be apparent to any person skilled in the art that the name can be assigned by the user. Following the example above, the user may assign 'Enhanced Video Conferencing Service' name to the new service.

Artifact download module 504 downloads usage information corresponding to the selected compatible services. The usage information is information the terms and conditions corresponding to the usage of the services. The usage information includes a service user manual, a version type, a term of use, a plurality of usage restrictions, billing information and copyright information.

Artifact download module 504 downloads the usage information corresponding to the selected compatible services from registered service provider 102 when the user selects the compatible services from the list of the compatible services sent by registered service provider 102. For example, if the user selects the desktop sharing service and the video conference recording service, the usage information corresponding to these services is downloaded from registered service provider 102.

User defined service registry module 506 stores one or more parameters corresponding to the new service. As explained earlier, the new service is the combination of the selected compatible services and the current service. The parameters are information relating to the name of the new service, the name of the selected compatible services, and the name of the current service. Further, user defined service registry module 506 maintains a list of all such new services, the compatible services and the current service. It may be apparent to any person skilled in the art that such a list is displayed to the user through wireless communication device 106. Whenever the user wishes again to use the new service, the user needs to select the new service from user defined service registry module 506. As a result, the user can access the new service without recombining the selected compatible services with the current service, based on the stored corresponding proxy clients.

Figure 6:
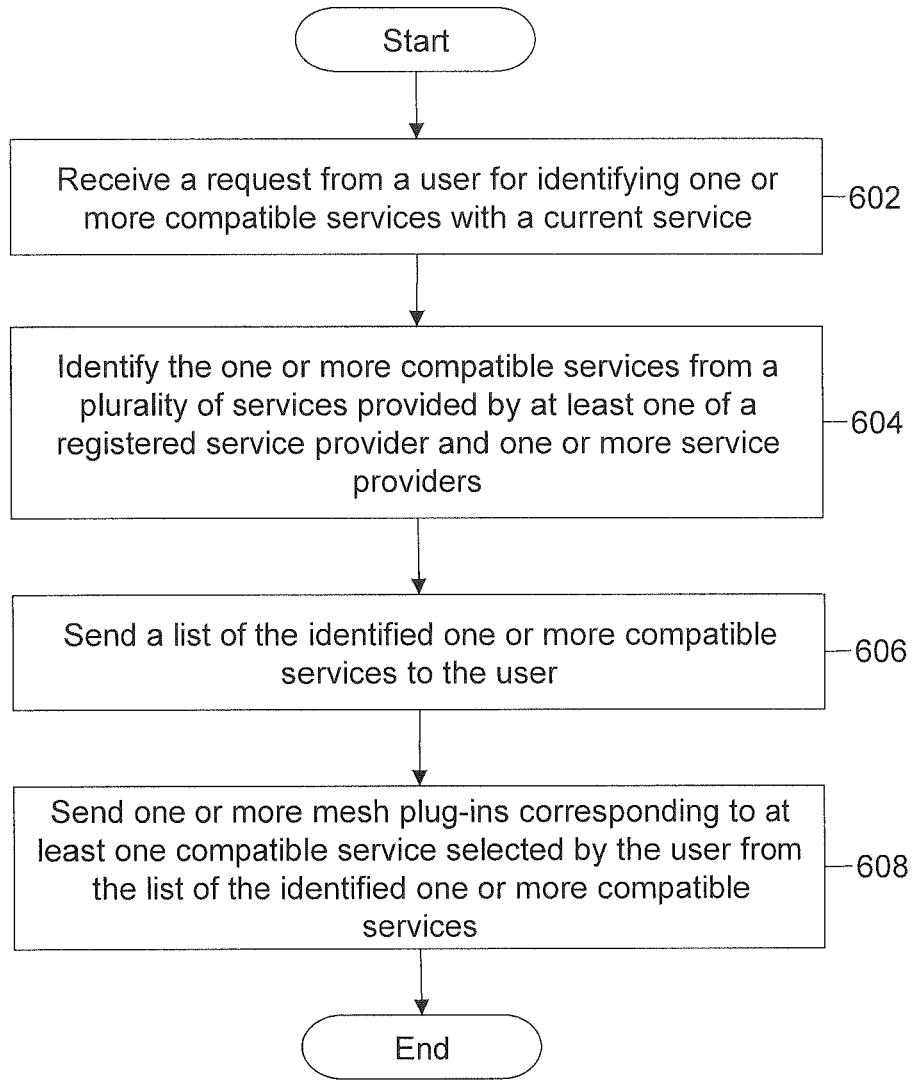
FIG. 6 is a flowchart of a method for enabling a user to combine one or more compatible services with a current service, in accordance with various embodiments of the invention.

FIG. 6 is a flowchart of a method for enabling a user to combine one or more compatible services with a current service, in accordance with various embodiments of the invention. The user is subscribed with a registered service provider such as registered service provider 102 for availing various services. Further, as explained earlier, there are a plurality of services provided by the registered service provider and one or more service providers, such as service providers 104. In various embodiments of the invention, the registered service provider, the other service providers, and a wireless communication device such as wireless communication device 106 are connected in a network such as network 108. The user may be availing a service currently, hereinafter referred to as a current service, such as video conferencing service provided by the registered service provider.

At step 602, a request is received to identify one or more compatible services with the current service. The one or more compatible services are provided by at least one of the registered service provider and the other service providers. The request is received by the registered service provider from the wireless communication device over the network. It may be apparent that the request is sent by the user through the wireless communication device. Following the example above, the request is received to identify the compatible services with the video conferencing service.

At step 604, the compatible services with the current service are identified by the registered service provider. The compatible services are identified from the services provided by the registered service provider and the service providers. For example, the identified compatible services with the video conferencing service include the desktop sharing service, the online gaming service, the video conference recording service, and the service that enables the user to email a recorded video conference.

In an embodiment of the invention, the compatible services are identified by the registered service provider from a list of the plurality of services. The list of services is stored at the registered service provider.

In another embodiment of the invention, the request is broadcasted to the registered service provider and the other service providers. In various embodiments of the invention, the request is broadcasted to one or more application servers associated with the registered service provider and the other service providers over the network. The compatible services are then identified by the registered service provider and the service providers in response to the broadcasted request. In an embodiment of the invention, each service provided by the registered service provider and the other service providers understands the inputs that it can handle, based on the current service. Further, each service parses the request and identifies if it is compatible with the current service.

At step 606, a list of the identified compatible services is sent to the wireless communication device by the registered service provider.

At step 608, one or more mesh plug-ins corresponding to at least one compatible service are sent to the wireless communication device when the at least one compatible service is selected by the user from the list of the identified compatible services. Further, as explained earlier, a mesh plug-in is software that facilitates the combination of the corresponding selected compatible service with the current service. For example, if the desktop sharing service and the video conference recording service are selected by the user, mesh plug-ins corresponding to the desktop sharing service and the video conference recording service are sent by the registered service provider to the wireless communication device. The mesh plug-ins enable the user to combine the desktop sharing service and the video conference recording service with the video conferencing service. The combination of the identified compatible services with the current service results in the formation of a new service.

In an embodiment of the invention, a single mesh plug-in facilitates the combination of the selected compatible services with the current service. For example, a single mesh plug-in facilitates the combination of the desktop sharing service and the video conference recording service. In another embodiment of the invention, each mesh plug-in corresponds to only one compatible service.

Figure 7A:
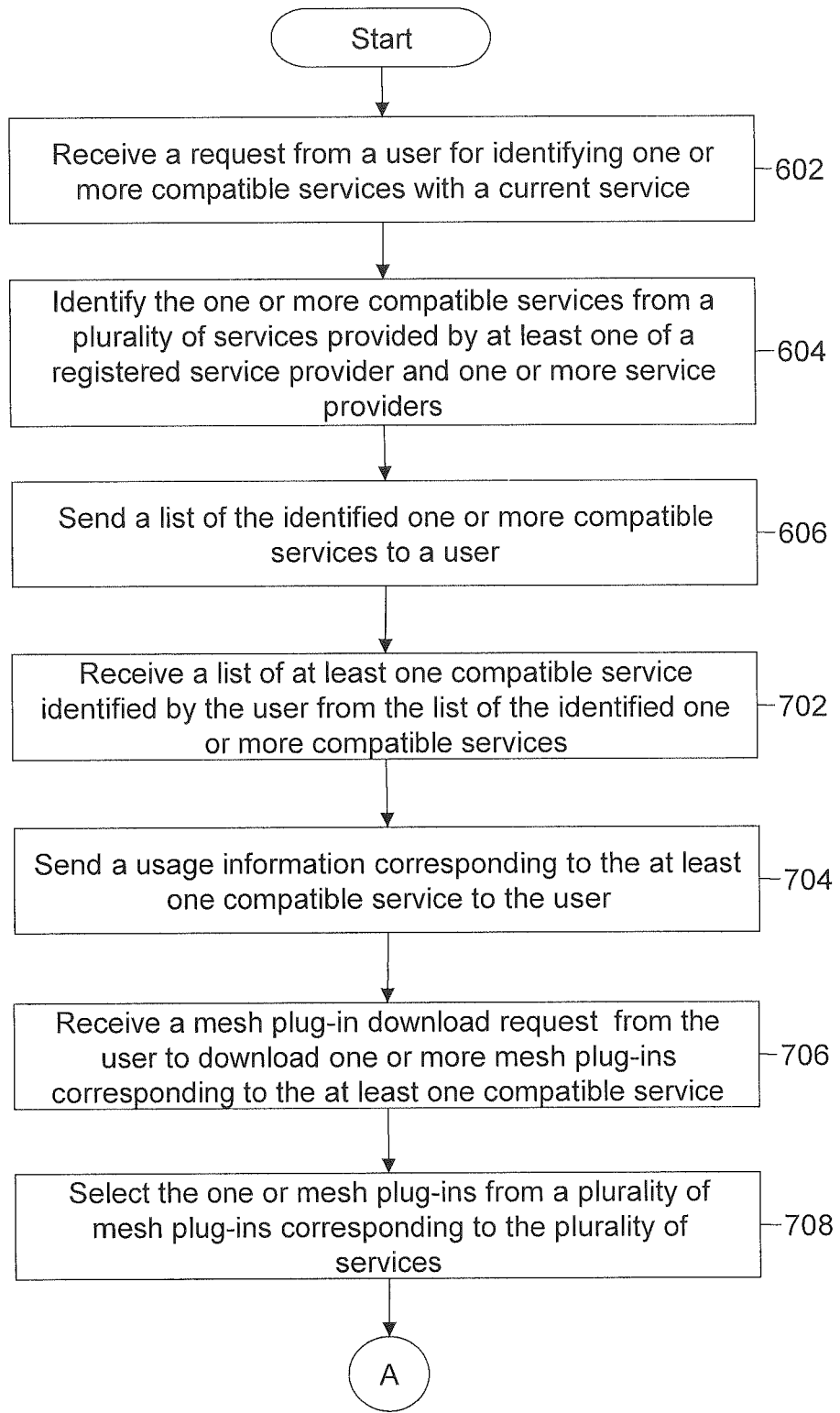
FIGS. 7a and 7b is a flowchart of a method for enabling a user to combine one or more compatible services with a current service, in accordance with an embodiment of the invention.
Figure 7B:
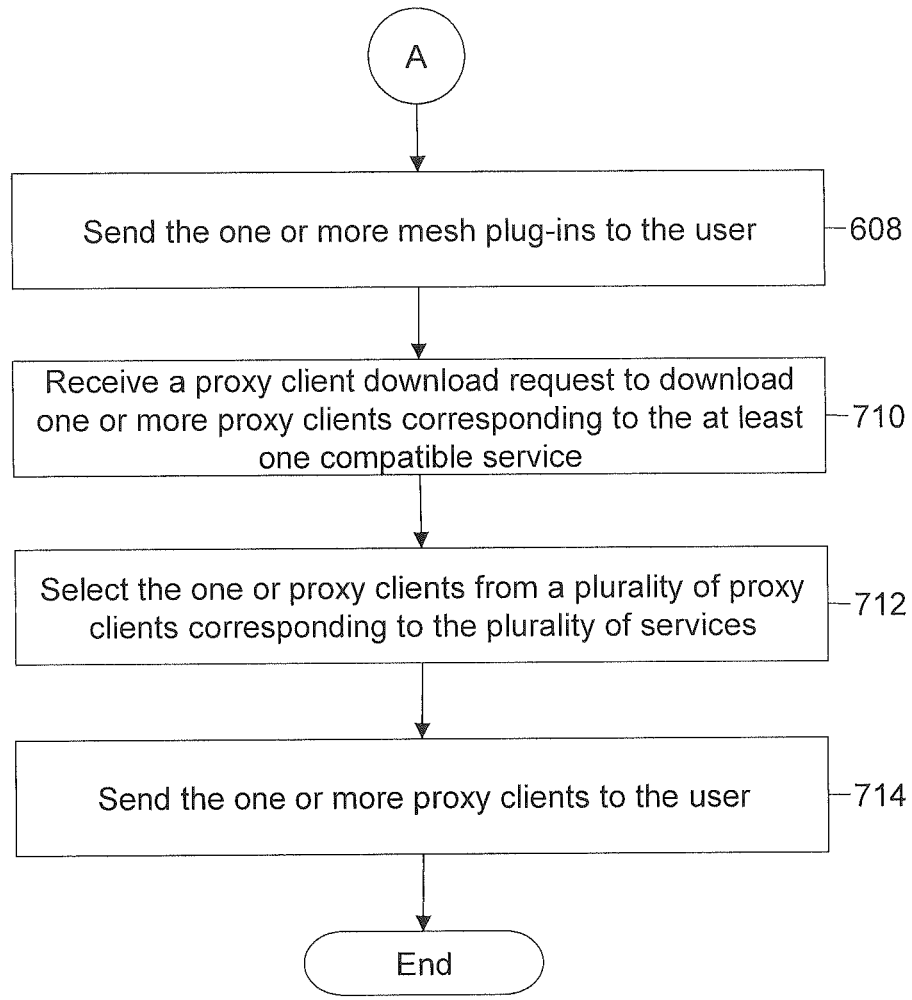

FIGS. 7a and 7b is a flowchart of a method for enabling a user to combine one or more compatible services with a current service, in accordance with an embodiment of the invention. In various embodiments of the invention, the user is subscribed with a registered service provider such as registered service provider 102. Further, as explained earlier, there are a plurality of services provided by the registered service provider and one or more service providers, such as service providers 104. For instance, the user may currently avail a service, hereinafter referred to as a current service, such as the video conferencing service provided by the registered service provider. As explained in FIG. 1, the registered service provider, the wireless communication device and the other service providers are connected in a network such as network 108.

At steps 602, 604 and 606, a request to identify one or compatible services with the current service is received by the registered service provider from the user. The one or more compatible services are identified by the registered service provider, and a list of the identified one or more compatible services is sent to the wireless communication device. The compatible services are identified from a plurality of service stored with the registered service provider and the other service providers. Further, steps 602, 604 and 606 of FIG. 7 have been explained in detail in conjunction with FIG. 6.

At step 702, a list of at least one compatible service is received by the registered service provider when the at least one compatible service is selected by the user from the list of the identified compatible services. Following the example above, a list containing the desktop sharing service and the video conference recording service is sent to the registered service provider when these services are selected by the user from the list of the identified compatible services.

At step 704, usage information corresponding to the selected compatible services is sent to the wireless communication device by the registered service provider. The usage information is information relating to the terms and conditions corresponding to the usage of the services. The usage information includes a service user manual, a version type, a term of use, a plurality of usage restrictions, billing information and copyright information.

The usage information corresponding to the selected compatible services is sent to the wireless communication device when the user selects the compatible services from the list of the compatible services sent by the registered service provider. Following the example above, if the user selects the desktop sharing service and the video conference recording service, the usage information corresponding to these services is sent to the wireless communication device by the registered service provider.

At step 706, a mesh plug-in download request is received to send one or more mesh plug-ins corresponding to the selected compatible services. The mesh plug-in download request is sent by the wireless communication device to the registered service provider when the user selects the at least one compatible service from the list of compatible services. Following the example above, a request to download mesh plug-ins corresponding to the desktop sharing service and video conference recording service is sent to the registered service provider when the user selects these services from the list of the compatible services.

At step 708, the one or more mesh plug-ins are selected from a plurality of mesh plug-ins corresponding to the services provided by the registered service provider and the other service providers. In various embodiments of the invention, the plurality of mesh plug-ins is stored at the registered service provider.

In an embodiment of the invention, a single mesh plug-in facilitates the combination of the selected compatible services with the current service. For example, a single mesh plug-in facilitates the combination of the desktop sharing service and the video conference recording service. In another embodiment of the invention, each mesh plug-in corresponds to only one compatible service.

Thereafter, the selected mesh plug-ins are sent to the wireless communication device. The selected mesh plug-ins corresponding to the selected compatible services enable the wireless communication device to combine the selected compatible services with the current service. Further, this is explained in detail in conjunction with step 608 of FIG. 6.

At step 710, a proxy client download request is received to send one or more proxy clients corresponding to the selected compatible services. A proxy client is software that facilitates the execution of a service from the corresponding registered service provider or the other service providers. The proxy client download request is sent by the wireless communication device to the registered service provider when the user selects the at least one compatible service from the list of compatible services. Following the example above, a request to download proxy clients corresponding to the desktop sharing service and the video conference recording service is sent to the registered service provider when the user selects these services from the list of the compatible services. It may be apparent to any person skilled in the art that a proxy client download request corresponding to the current service will also be received by the registered service provider.

At step 712, the one or more proxy clients are selected from a plurality of proxy clients corresponding to the services provided by the registered service provider and the other service providers. The plurality of proxy clients is stored at the registered service provider. Following the example above, proxy clients corresponding to the desktop sharing service, the video conference recording service and the video conferencing service are selected by the registered service provider.

At step 714, the selected one or more proxy clients are sent to the wireless communication device from the registered service provider. Following the example above, the selected proxy clients corresponding to the desktop sharing service, the video conference recording service and the video conferencing service are sent to the wireless communication device. The proxy clients facilitate the execution of the selected compatible services along with the current service on the corresponding registered service provider or the other service providers. Following the example above, if the desktop sharing service is provided by a service provider of the other service providers, the desktop sharing service is executed at the service provider. If the video conference recording service is provided by the registered service provider, then the video conference recording service is executed at the registered service provider. In various embodiments of the invention, the selected compatible services and the current service are executed at corresponding application servers, such as application servers 110 associated with the registered service provider or the other service providers.

Figure 8:
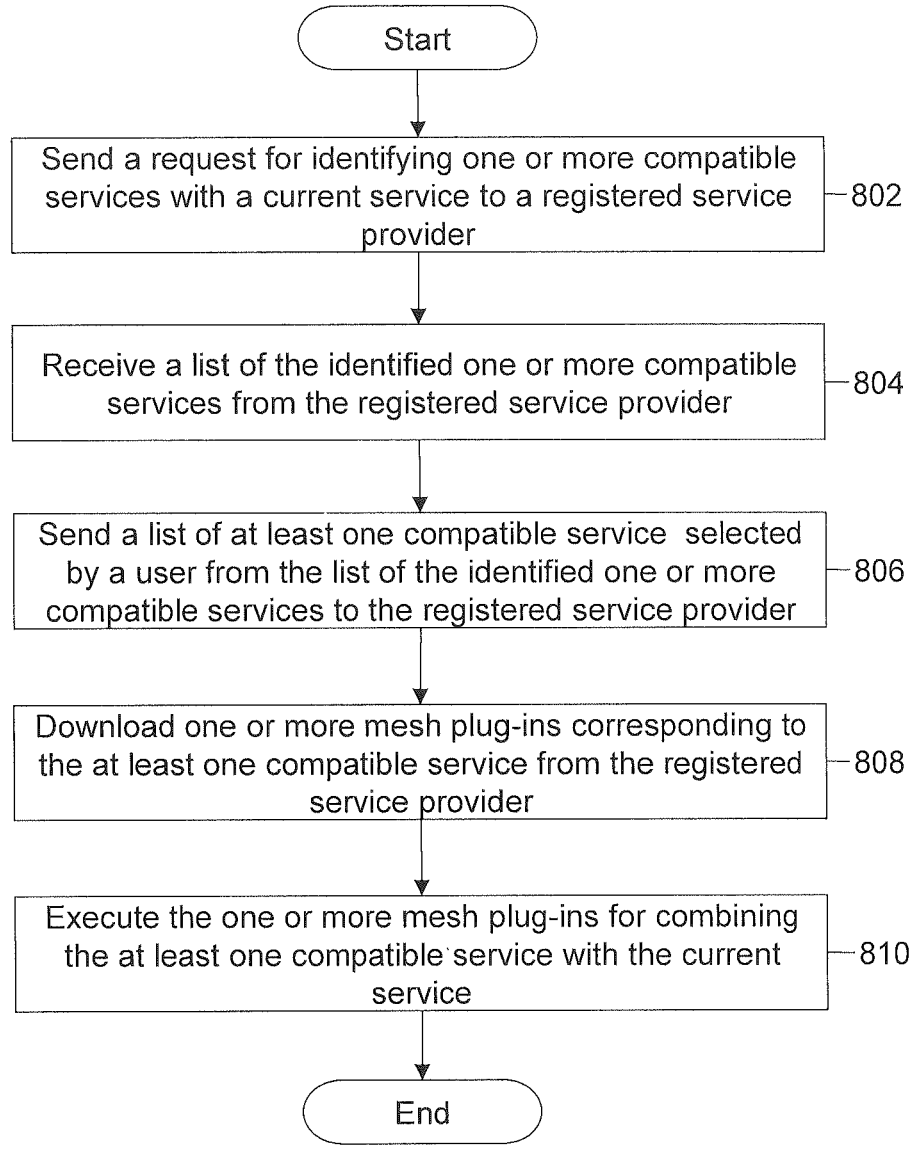
FIG. 8 is a flowchart of a method for combining one or more compatible services with a current service, in accordance with various embodiments of the invention.

FIG. 8 is a flowchart of a method for combining one or more compatible services with a current service, in accordance with various embodiments of the invention. A user is subscribed with a registered service provider such as registered service provider 102 for availing various services. Further, as explained earlier, there are a plurality of services provided by the registered service provider and one or more service providers, such as service providers 104. In various embodiments of the invention, the registered service provider, the other service providers and a wireless communication device such as wireless communication device 106 are connected in a network such as network 108. The user may currently avail a service, hereinafter referred to as a current service, such as the video conferencing service provided by the registered service provider.

At step 802, a request is sent to identify one or more compatible services with the current service. The request is sent by the wireless communication device to the registered service provider over the network. The compatible services are provided by at least one of the registered service provider and the other service providers. Following the example above, a request to identify the compatible services with the video conferencing service is sent by the user to the registered service provider.

At step 804, a list of the compatible services is received by the wireless communication device from the registered service provider. The compatible services are identified by the registered service provider. Further, the identification of the compatible services is explained in detail in conjunction with step 604 of FIG. 6. Following the example above, the compatible services with the video conferencing service include the desktop sharing service, the online gaming service, the video conference recording service and the service that enables the user to email a recorded video conference.

At step 806, a list of at least one compatible service is sent to the registered service provider when the at least one compatible service is selected by the user from the received list of the compatible services. Following the example above, a list of the desktop sharing service and the video conference recording service is sent to the registered service provider when the desktop sharing service and the video conference recording are selected by the user from the received list of the identified compatible services with the video conferencing service.

At step 808, one or more mesh plug-ins corresponding to the selected compatible services are downloaded by the wireless communication device when the at least one compatible service is selected by the user from the list of the identified compatible services. As explained earlier, a mesh plug-in is software that facilitates the combination of the corresponding selected compatible service with the current service. The mesh plug-ins are selected by the registered service provider. Further, the selection of the mesh plug-ins is explained in detail in conjunction with 706 and 708 of FIG. 7. Following the example above, mesh plug-ins corresponding to the desktop sharing service and the video conference recording service are downloaded by the wireless communication device.

In an embodiment of the invention, a single mesh plug-in is downloaded which facilitates the combination of the selected compatible services with the current service. For example, a single mesh plug-in facilitates the combination of the desktop sharing service and the video conference recording service. In another embodiment of the invention, each mesh plug-in corresponds to only one compatible service.

At step 810, the downloaded mesh plug-ins are executed to combine the selected compatible services with the current service. The mesh plug-ins are executed on the wireless communication device. Each mesh plug-in of the one or more mesh plug-ins then combines the corresponding compatible service with the current service. The combination of the compatible services with the current service results in the formation of a new service. For example, the desktop sharing service and the video conference recording service are combined with the video conferencing service by the downloaded mesh plug-ins corresponding to the desktop sharing service and the video conference recording service. The combination of the desktop sharing service and the video conference recording service with the video conferencing service results in the formation of an enhanced video conferencing service.

Figure 9A:
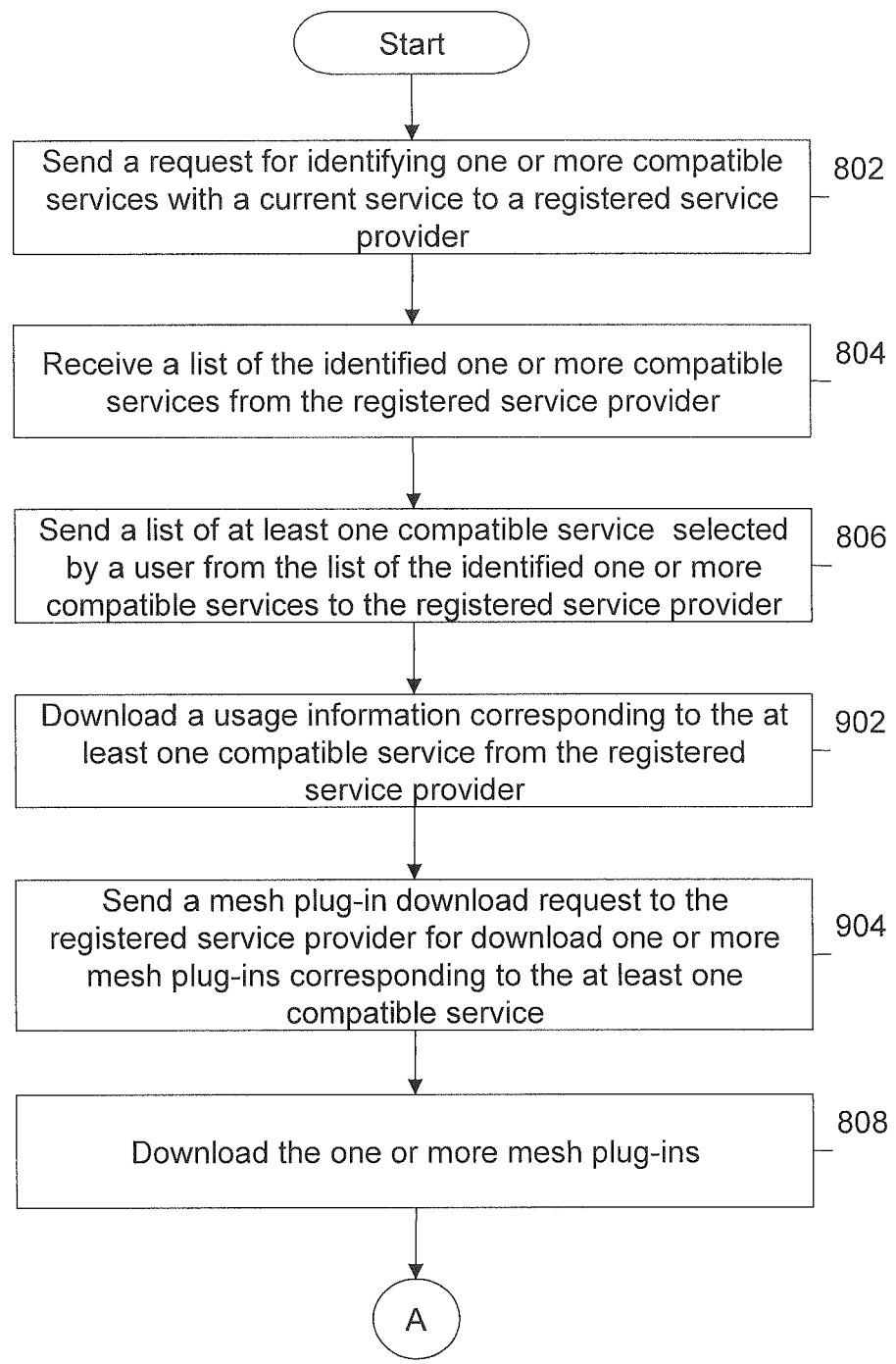
FIGS. 9a and 9b is a flowchart of a method for combining one or more compatible services with a current service, in accordance with an embodiment of the invention.
Figure 9B:
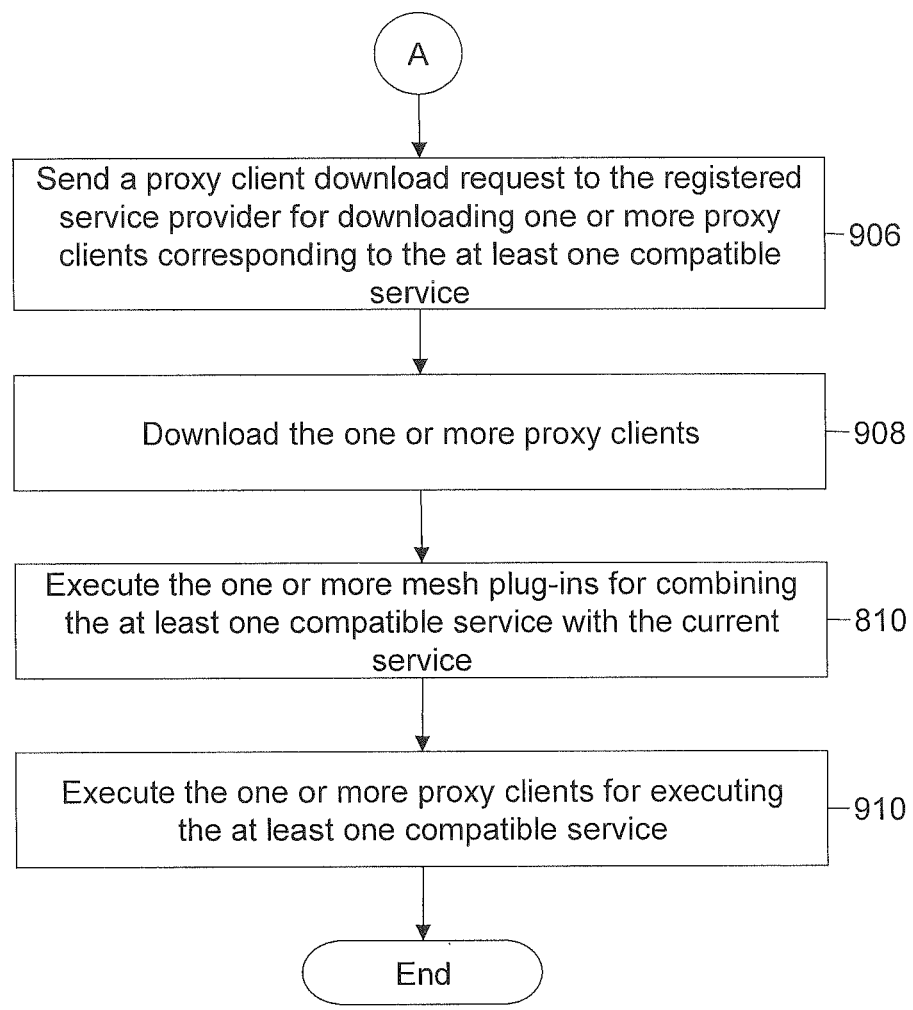

FIGS. 9a and 9b is a flowchart of a method for combining one or more compatible services with a current service, in accordance with an embodiment of the invention. A user is subscribed with a registered service provider such as registered service provider 102 for availing various services. Further, as explained earlier, there are a plurality of services provided by the registered service provider and one or more service providers, such as service providers 104. In various embodiments of the invention, the registered service provider, the other service providers and a wireless communication device such as wireless communication device 106 are connected in a network such as network 108.

At steps, 802, 804 and 806, a request is sent to identify the one or more compatible services by the wireless communication device to the registered service provider. A list of the identified compatible services is received by the wireless communication device from the registered service provider in response to the request. At least one compatible service is selected by the user from the list of the identified compatible services. A list of the selected compatible services is sent to the registered service provider. Further, steps 802, 804 and 806 of FIG. 9 have been explained in detail in conjunction with FIG. 8.

At step 902, usage information corresponding to the selected compatible services is downloaded by the wireless communication device from the registered service provider. The usage information is information relating to the terms and conditions corresponding to the usage of the services. The usage information includes a service user manual, a version type, a term of use, a plurality of usage restrictions, billing information and copyright information.

The usage information corresponding to the selected compatible services is downloaded by the wireless communication device when the user selects the at least one compatible service from the list of the compatible services sent by the registered service provider. Following the example above, when the user selects the desktop sharing service and the video conference recording service, the usage information corresponding to these services is downloaded by the wireless communication device from the registered service provider.

At step 904, a mesh plug-in download request is sent to download one or more mesh plug-ins corresponding to the selected compatible services. The mesh plug-in download request is sent by the wireless communication device to the registered service provider when the user selects the at least one compatible service from the received list of identified compatible services. Following the example above, a mesh plug-in download request to download mesh plug-ins corresponding to the desktop sharing service and the video conference recording service is sent to the registered service provider when the desktop sharing service and the video conference recording service are selected from the list of identified compatible services with the video conferencing service.

Thereafter, the mesh plug-ins are downloaded by the wireless communication device. As explained earlier, the mesh plug-ins corresponding to the selected compatible services are identified by the registered service provider. Further, this is explained in detail in conjunction with step 808 of FIG. 8.

At step 906, a proxy client download request is sent to download one or more proxy clients corresponding to the selected compatible services. A proxy client is software that facilitates the execution of a service from the corresponding registered service provider and the other service providers. The proxy client download request is sent by the wireless communication device to the registered service provider when the user selects the at least one compatible service from the received list of identified compatible services. Following the example above, the proxy client download request to download proxy clients corresponding to the desktop sharing service and the video conference recording service is sent to the registered service provider when the user selects these services from the received list of compatible services with the video conferencing service.

At step 908, the proxy clients are downloaded by the wireless communication device from the registered service provider. Following the example above, the proxy clients corresponding to the desktop sharing service and the video conference recording service are downloaded by the wireless communication device from the registered service provider.

The downloaded mesh plug-ins are executed at the wireless communication device to combine the selected compatible services with the current service. The combination of the compatible services with the current service results in the formation of a new service. Further, this is explained in detail in conjunction with step 810 of FIG. 8.

At step 910, the downloaded proxy clients are executed by the wireless communication device. Each proxy client executes the corresponding compatible service on the corresponding registered service provider or the other service providers. It may be apparent that the current service is also executed based on the corresponding proxy client. Following the example above, if the desktop sharing service is provided by a service provider of the other service providers, the desktop sharing service is executed at the service provider. If the video conference recording service is provided by the registered service provider, then the video conference recording service is executed at the registered service provider. In various embodiments of the invention, the selected compatible services are executed at corresponding application servers, such as application servers 110 associated with the registered service provider or the other service providers.

The method, system, wireless communication device and computer program product described above have a number of advantages. The system and the wireless communication device enable a user to combine one or more compatible services with a current service. This facilitates the enhancement of the current service. Further, the system and wireless communication device enable the user to access the service from multiple service providers in addition to a registered service provider. Furthermore, since the services are executed independently at the corresponding service providers, it is easy for the service providers to charge the user according to the usage of the services.

The system and wireless communication device for combining compatible services, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for combining compatible services. The computer program product includes a computer usable medium having a set program instructions comprising a program code for combining compatible services. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A wireless communication device for combining one or more compatible services with a current service being delivered to a user of the wireless communication device through the wireless communication device, said user of subscribed to a registered service provider, the current service being delivered at the wireless device the registered service provider, the one or more compatible services being provided by at least one of the registered service provider and one or more service providers, the registered service provider and the one or more service providers being connected in a network, the wireless communication device comprising:

a processor implemented communicator configured for:
receiving a list of the one or more compatible services from the registered service provider based on a request, the request being sent by the user for identifying the one or more compatible services, the request being sent to the registered service provider, wherein identification of a compatible service is based on capability of the identified service to be combined with the current service being delivered at the wireless communication device: and
sending a list of at least one compatible service, the at least one compatible service being selected from the list of the one or more compatible services, the at least one compatible service being selected by the user;
a processor implemented mesh plug-in-download module configured for downloading one or more mesh plug-ins corresponding to the at least one compatible service, wherein each mesh plug-in downloaded onto the wireless communication device enables the user to simultaneously receive and access at the wireless communication device, at least one compatible service and the current service, wherein the at least one compatible service is executed at a first server and the current service is executed at a second server, which first and second servers are distinct; and
a processor implemented service enabler module configured for executing the one or more mesh plug-ins, wherein the execution of the one or more mesh plug-ins facilitates combining the at least one compatible service with the current service for simultaneous user access at the wireless communication device.

2. The wireless communication device according to claim 1, wherein the processor implemented mesh plug-in download module is further configured for storing the one or more mesh plug-ins.

3. The wireless communication device according to claim 1 further comprising a processor implemented proxy client download module configured for downloading one or more proxy clients corresponding to at least one of the at least one compatible service and the current service.

4. The wireless communication device according to claim 3, wherein the processor implemented service enabler module is further configured for executing the one or more proxy clients corresponding to at least one of the current service and the at least one compatible service, wherein the execution of the corresponding one or more proxy clients facilitates the execution of the at least one compatible service and the current service, the at least one compatible service and the current service being executed at the corresponding service provider.

5. The wireless communication device according to claim 3, wherein the processor implemented proxy client download module is further configured for storing the one or more proxy clients.

6. The wireless communication device according to claim 3, wherein the processor implemented communicator module is further configured for sending a proxy client download request to download at least one of the one or more proxy clients corresponding to the at least one compatible service and the current service, the proxy client download request being sent to the registered service provider.

7. The wireless communication device according to claim 1, wherein the communicator is further configured for sending a mesh plug-in download request to download the one or more mesh plug-ins corresponding to the at least one compatible service, the mesh plug-in download request being sent to the registered service provider.

8. The wireless communication device according to claim 1, wherein the processor implemented service enabler module is further configured for assigning a name to a new service, wherein the new service is a combination of the current service and the at least one compatible service.

9. The wireless communication device according to claim 8 further comprising a processor implemented user defined service registry module configured for storing one or more parameters of the new service, the one or more parameters being at least one of the name of the new service, the list of the at least one compatible service and a name of the current service.

10. The wireless communication device according to claim 1 further comprising processor implemented artifact download module configured for downloading a usage information corresponding to the at least one compatible service, the usage information being at least one of a service user manual, a version type, a term of use, a plurality of usage restrictions, a billing information, and a copyright information.

11. A method for combining one or more compatible services with a current service being delivered to a user of a wireless communication device through the wireless communication device, said user being subscribed to a registered service provider, the current service being delivered at the wireless device by the registered service provider, the one or more compatible services being provided by at least one of the registered service provider and one or more service providers, the registered service provider and the one or more service providers being connected in a network, the method comprising:
sending over a wireless communication network, a request for identifying the one or more compatible services, the request being sent by the user from the wireless communication device to the registered service provider;
receiving over the wireless communication network, a list of the one or more compatible services, the list of the one or more compatible services being received at the wireless communication device from the registered service provider, wherein identification of a compatible service is based on capability of the identified service to be combined with the current service being delivered at the wireless communication device;
sending over the wireless communication network, a list of at least one compatible service, the list of the at least one compatible service being sent to the registered service provider, the at least one compatible service being selected from the list of the one or more compatible services, the at least one compatible service being selected by the user through the wireless communication device;
downloading onto the wireless communication device, one or more mesh plug-ins corresponding to the at least one compatible service, wherein each mesh plug-in downloaded onto the wireless communication device enables the user to simultaneously receive and access at the wireless communication device, at least one compatible service and the current service, wherein the at least one compatible service is executed at a first server and the current service is executed at a second server, which first and second servers are distinct; and
executing at a processor within the wireless communication device, the one or more mesh plug-ins, wherein an execution of the one or more mesh plug-ins enables the user to simultaneously access the at least one compatible service with the current service, at the wireless communication device.

12. The method according to claim 11, wherein downloading the one or more mesh plug-ins comprises sending a mesh plug-in download request to download the one or more mesh plug-ins corresponding to the at least one compatible service, the mesh plug-in download request being sent to the registered service provider.

13. The method according to claim 11 further comprising downloading one or more proxy clients corresponding to at least one of the at least one compatible service and the current service, wherein the corresponding one or more proxy clients facilitates execution of the at least one compatible service and the current service, the at least one compatible service and the current service being executed at the corresponding service provider.

14. The method according to claim 13, wherein downloading the one or more proxy clients comprises sending a proxy client download request to download the one or more proxy clients corresponding to at least one of the at least one compatible service and the current service, the proxy client download request being sent to the registered service provider.

15. The method according to claim 13 further comprising executing the one or more proxy clients, wherein the execution of the corresponding one or more proxy clients facilitates the execution of the at least one compatible service and the current service.

16. The method according to claim 11 further comprising assigning a name to a new service, wherein the new service is a combination of the current service and the at least one compatible service.

17. The method according to claim 16 further comprising storing one or more parameters of the new service, the one or more parameters being at least one of the name of the new service, the list of the at least one compatible service and a name of the current service.

18. The method according to claim 11 further comprising downloading a usage information corresponding to the at least one compatible service, the usage information being at least one of a service user manual, a version type, a term of use, a plurality of usage restrictions, a billing information, and a copyright information.

19. A computer program product for use with a computer, the computer program product comprising a non-transitory computer usable medium having a computer readable program code embodied therein for combining one or more compatible services with a current service being delivered to a user of a wireless communication device through the wireless communication device, said user being subscribed to a registered service provider, the current service being delivered at the wireless device by the registered service provider, the one or more compatible services being provided by at least one of the registered service provider and one or more service providers, the registered service provider and the one or more service providers being connected in a network, the computer readable code performing:
  sending over a wireless communication network, a request for identifying the one or more compatible services, the request being sent by the user from the wireless communication device to the registered service provider;
  receiving over the wireless communication network, a list of the one or more compatible services, the list of the one or more compatible services being received at the wireless communication device from the registered service provider, wherein identification of a compatible service is based on capability of the identified service to be combined with the current service being delivered at the wireless communication device;
  sending over the wireless communication network, a list of at least one compatible service, the list of the at least one compatible service being sent to the registered service provider, the at least one compatible service being selected from the list of the one or more compatible services, the at least one compatible service being selected by the user through the wireless communication device;
  downloading onto the wireless communication device, one or more mesh plug-ins corresponding to the at least one compatible service, wherein each mesh plug-in downloaded onto the wireless communication device enables the user to simultaneously receive and access at the wireless communication device, at least one compatible service and the current service, wherein the at least one compatible service is executed at a first server and the current service is executed at a second server, which first and second servers are distinct; and
  executing at a processor within the wireless communication device, the one or more mesh plug-ins, wherein an execution of the one or more mesh plug-ins enables the user to simultaneously access the at least one compatible service with the current service, at the wireless communication device.

20. The computer program product of claim 19, wherein downloading the one or more mesh plug-ins comprises sending a mesh plug-in download request to download the one or more mesh plug-ins corresponding to the at least one compatible service, the mesh plug-in download request being sent to the registered service provider.

21. The computer program product of claim 19, wherein the computer readable program code further performs downloading one or more proxy clients corresponding to at least one of the at least one compatible service and the current service, wherein the corresponding one or more proxy clients facilitates execution of the at least one compatible service and the current service, the at least one compatible service and the current service being executed at the corresponding service provider.

22. The computer program product of claim 21, wherein downloading the one or more proxy clients comprises sending a proxy client download request to download the one or more proxy clients corresponding to at least one of the at least one compatible service and the current service, the proxy client download request being sent to the registered service provider.

23. The computer program product of claim 21, wherein the computer readable program code further performs executing the one or more proxy clients, wherein the execution of the corresponding one or more proxy clients facilitates the execution of the at least one compatible service and the current service.

24. The computer program product of claim 19, wherein the computer readable program code further performs assigning a name to a new service, wherein the new service is a combination of the current service and the at least one compatible service.

25. The computer program product of claim 24, wherein the computer readable program code further performs storing one or more parameters of the new service, the one or more parameters being at least one of the name of the new service, the list of the at least one compatible service and a name of the current service.

26. The computer program product of claim 19, wherein the computer readable program code further performs downloading a usage information corresponding to the at least one compatible service, the usage information being at least one of a service user manual, a version type, a term of use, a plurality of usage restrictions, a billing information, and a copyright information.

\* \* \* \* \*